United States Patent Office 3,507,890
Patented Apr. 21, 1970

3,507,890
CONTINUOUS DIMERIZATION PROCESS
Gerhard Dieckelmann, Hilden, and Horst Rutzen, Dusseldorf-Holthausen, Germany, assignors to Henkel & Cie, G.m.b.H., Dusseldorf-Holthausen, Germany, a corporation of Germany
No Drawing. Filed June 12, 1967, Ser. No. 645,462
Claims priority, application Germany, Aug. 24, 1966, H 60,326
Int. Cl. C08h 9/00; C09f 7/06
U.S. Cl. 260—407                              7 Claims

ABSTRACT OF THE DISCLOSURE

Continuous process for the dimerization of esters of unsaturated fatty acids having 12 to 24 carbon atoms and saturated monoalcohols of 1 to 6 carbon atoms in the presence of saturated monoalcohols of 1 to 6 carbon atoms with good yields and no loss of catalyst.

PRIOR ART

U.S. Patent No. 2,347,562 discloses the polymerization of methyl esters of unsaturated fatty acids by heating for several hours in an inert atmosphere at temperatures above 280° C. in the presence of a catalyst such as bleaching clay, fuller's earth or bentonite which may be acid treated. U.S. Patent No. 2,793,220 describes the polymerization of polyunsaturated fatty acids by heating at temperatures of 215–260° C. in the presence of 1 to 5% by weight of water and 1 to 20% by weight of an acid or acid treated crystalline clay.

These two processes have the disadvantage that they have to be conducted batchwise and cannot be conducted continuously.

The fatty acid is brought to polymerization temperature in individual batches, partially cooled again after the reaction is completed, then freed of the alumina catalyst by filtration or decanting, and again heated to distillation temperatures. This process is cumbersome and energy-consuming. Furthermore, the consumption of alumina catalyst is relatively great since the catalyst once used and having come in the meantime in contact with air, promotes the formation of dark-colored dimerization products and, therefore, the catalyst usually has to be discarded. Moreover, the separated alumina includes relatively large amounts of monomeric or dimeric fatty acids which can be extracted from the catalyst slurry only with considerable difficulty and, therefore, this usually represents a loss of material.

OBJECTS OF THE INVENTION

It is an object of the invention to provide a continuous process for the dimerization of esters of unsaturated fatty acids with low heat requirements and increased yields.

It is a further object of the invention to provide a continuous process of dimerization of unsaturated fatty acid esters with little or no catalyst consumption.

These and other objects and advantages of the invention will become obvious from the following detailed description.

THE INVENTION

The process of the invention for the continuous dimerization of esters of unsaturated fatty acids of 12 to 24 carbon atoms and saturated monoalcohols of 1 to 6 carbon atoms comprises passing esters of unsaturated fatty acids of 12 to 24 carbon atoms and a saturated monoalcohol admixed with a staturated monoalcohol of 1 to 6 carbon atoms through a stationary crystalline clay catalyst under a partial inert gas pressure of more than 10 atmospheres at a temperature of 160 to 270° C. and separating unreacted monomer from the reaction product, preferably by distillation.

Examples of suitable mono- and poly-unsaturated fatty acids of 12 to 24 carbon atoms whose esters may be used in the process of the invention are palmitoleic acid, oleic acid, ricinoleic acid, linoleic acid, linolenic acid, arachidonic acid, erucic acid, mixtures of mono- and poly-unsaturated fatty acids derived from highly unsaturated drying or nondrying oils such as linseed oil, soya bean oil, tall oil, cottonseed oil, sunflower oil, etc. The latter mixtures usually contain saturated fatty acids which will not interfere with the dimerization process.

The said fatty acids may be esterified with a saturated monoalcohol of 1 to 6 carbon atoms in any of the well known methods. Examples of suitable saturated monoalcohols are methanol, ethanol, n-propanol, isopropanol, n-butanol, iso-butanol, sec.-butanol, amyl alcohol and its isomers, cyclohexanol, etc. The preferred fatty acid esters are the methyl esters.

The fatty acid esters are admixed with one or more saturated monoalcohols prior to introduction into the reaction zone in a volume ratio of ester to alcohol of 4:1 to 1:4, preferably, 2:1 to 1:2.

Examples of suitable crystalline clay catalysts are clays or bentonites having a high content of montmorillonite, kaolinite or attapulgite and these are commercially available as bleaching earth, fuller's earth, Florida earth, Tonsil or Filtrol. The said clays may be basic, acidic or neutral reacting or may be treated with acidic or basic substances. Neutral or acid reacting catalysts are preferably employed since they furnish a lighter product and usually a higher yield of the dimerization product. Advantageously, the pH value of the catalysts employed is determined with a glass electrode on a 10% suspension in water after standing about 10 minutes.

In the event that the catalyst is not already present in the form of coarse grains or lumps, it can be pressed in a known manner into beads, tablets or particles of any desired form so that a reactor filled with the catalyst is still sufficiently penetrable by liquids. Prior to the compression processes, inert or resistance improving fillers such as carbon black, diatomaceous earth or pumice powder can be added. Furthermore, mixtures of acid, neutral or basic catalysts can be employed. The process can be modified by passing the mixture to be dimerized successively through two or more different catalysts beds.

The reaction is conducted in an inert atmosphere free of oxygen. Examples of suitable inert gases are, nitrogen, hydrogen, carbon dioxide and lower molecular weight hydrocarbons. It is quite startling to note that the pressure present in the reactor is of considerable significance with regard to yield and color of the reaction product. If the pressure of the inert gas at room temperature is below 10 atmospheres, the yield in dimerized esters diminishes considerably and simultaneously their discoloration is more pronounced. Therefore, the partial pressure of the inert gas should be more than 10 atmospheres, preferably from 100–300 atmospheres. The upper limit of pressure is limited only by the structural design of the reactor, but no particular advantages are obtained if the pressure substantially exceeds 500 atmospheres.

The reaction temperature ranges from 160–270° C., preferably from 180°–220° C. Already at temperatures below 200° C., in spite of a short reaction time, high yields in dimerization products are obtained. This is a rather startling phenomena since previously the dimerization temperature had to be above 210° C. if excessively long reaction times or poor yields in dimerization products were to be avoided. The opportunity to conduct the dimerization at temperatures below 200° C. is a substantial technical progress since the heating of the apparatus can be effected with vapor at medium pressure, which according to general experience, is available in many industrial plants.

The usual flow-through devices which are suitable for continuous hydrogenation or "crack-processes" are used to conduct the reaction. In the simplest construction form, they consist of an elongated or spiral heatable tube which is filled with the catalyst in the form of beads or grains with means to maintain the required pressure as well as a uonform throughput attached to the apparatus. The reaction tube can also be equipped with appropriate installation means to facilitate a supply of fresh catalyst as well as the discharge of expended catalyst and/or means to assure that the catalyst will become stationary and thus will not obstruct the flow.

The dimerization can be effected by feeding the fatty acid esters admixed, preferably, with anhydrous, low molecular weight alcohols into the reactor under pressure and, then after the reaction mixture has left the reactor, it is freed of the admixed alcohol by fractional condensation. The recovered alcohol can be used again for the same process. Next, the unreacted monomeric fatty acid ester is distilled off in vacuo from the residual dimeric fatty acid esters in a distillation apparatus attached to the reactor. This distillation can also be conducted in a continuously operating rectifying column. A small filter can be disposed between reactor and distilling apparatus which serves to retain small particles of catalyst eventually carried along by the reaction mixture. Furthermore, the supplied, respectively drained-off mixtures can be passed through heat exchangers to guarantee a favorable utilization of the heat. Lastly, several reactors can be series-connected, each being filled with the same or, as previously indicated, with different catalysts.

The recovered monomeric esters frequently contain still polymerizable material and can, if so desired, be reacted anew.

The dimeric fatty acid esters obtained by the process are distinguished by a light color and a low content of polymeric material. This content of polymers, which imparts an undesirably high degree of viscosity to the dimerization product and which considerably restricts the industrial uses of the prior art products amounts generally to 20–25% in the fatty acid dimerization products prepared by the prior art processes and in the products obtained by the process of the invention the amount of polymers is only about 10%.

In the following examples there are described several preferred embodiments to illustrate the invention. However, it should be understood that the invention is not intended to be limited to the specific embodiments.

EXAMPLE I

Commercially available Tonsil Standard (a highly active bleaching earth) having a pH of 3.5 was admixed with 3% by weight of graphite and the mixture was compressed in tablets of 4 mm. diameter to form the contact catalyst. The said catalyst was filled into a reactor of a 14-liter hydrogenation apparatus and purified nitrogen was introduced therein at a pressure of about 125 atmospheres. The apparatus was heated to a reaction temperature of 200° C. while circulating the nitrogen by means of a pump whereby the nitrogen pressure increased to about 150 atmospheres. First, 5 liters of methanol per hour, and then a mixture of 1 part by volume of the methyl ester of soya bean fatty acid (acid No.=1.5; saponification No.=189; iodine No.=133) and 1 part by volume of methanol at a rate of 1 liter per hour was pumped through the contact catalyst. The methanol was removed from the drainage liquid first under normal pressure, then under water-jet vacuum. The separation of the monomeric and dimeric reaction product was then effected by distillation at a temperature of 120°–220° C. and under a vacuum of 0.1 torr to obtain a 55% yield of the dimeric ester. The identification numbers were:

|  | Monomer | Dimer |
| --- | --- | --- |
| Iodine No | 38.0 | 65.5 |
| Acid No | 2.0 | 2.5 |
| Saponification No | 187 | 186 |
| Viscosity (at 20° C.) |  | 260 cP |
| Lovibond 1″-cup: |  |  |
| Yellow |  | 29.9 |
| Red |  | 6.5 |
| Blue |  | 0 |

Distillation of the dimeric ester under high vacuum showed that there was a 9% polymer portion remaining in the residue.

EXAMPLE II

The process of Example I was repeated except that the dimerization temperature in the reactor was lowered to 193° C. with a nitrogen pressure of 250 atmospheres and the throughput rate of the ester-methanol mixture was increased to 2 liters per hour. A 60% yield of the dimer ester was obtained and analysis of the product was as follows:

|  | Monomer | Dimer |
| --- | --- | --- |
| Acid No | 1.8 | 2.0 |
| Saponification No | 190 | 188 |
| Iodine No | 83 | 110 |
| Viscosity (at 20° C.) |  | 324 cP |
| Polymer portion, percent |  | 12 |
| Lovibond 1″-cup: |  |  |
| Yellow |  | 29.9 |
| Red |  | 6.3 |
| Blue |  | 0 |

EXAMPLE III

The process of Example I was repeated using hydrogen at a pressure of 250 atmospheres as the insert gas and the reaction temperature was 220° C. with a throughput rate for the ester-methanol mixture of 3 liters per hour. A 50% yield of the dimer ester was obtained and analysis of the product was as follows:

|  | Monomer | Dimer |
| --- | --- | --- |
| Acid No | 3.1 | 3.3 |
| Saponification No | 191 | 190 |
| Iodine No | 66 | 109 |
| Viscosity (at 20° C.) |  | 244 cP |
| Polymer portion, percent |  | 11 |
| Lovibond 1″-cup: |  |  |
| Yellow |  | 29.9 |
| Red |  | 8.8 |
| Blue |  | 0.1 |

EXAMPLE IV

The process of Example III was repeated except that the methyl ester of soya bean fatty acid had a saponification No. of 190 and an iodine No. of 190. A 44% yield of dimer ester was obtained and analysis of the product was as follows:

|  | Monomer | Dimer |
| --- | --- | --- |
| Acid No | 2.0 | 2.6 |
| Spaonification No | 189 | 188 |
| Iodine No | 96 | 108 |
| Viscosity (at 20° C.) |  | 426 cP |
| Polymer portion, percent |  | 17 |
| Lovibond 1″-cup: |  |  |
| Yellow |  | 29.9 |
| Red |  | 11.2 |
| Blue |  | 0.1 |

EXAMPLE V

A slightly alkaline reacting floridine earth having a pH of 8.4 was admixed with 3% by weight of graphite and was compressed into 4 mm. tablets to form the contact catalyst. Using the apparatus of Example I with a hydrogen pressure of 250 atmospheres and a reaction temperature of 220° C., first methanol and the methanol-methyl ester of soya bean fatty acid of Example I were passed therethrough at a rate of 1 liter per hour. A 37% of the dimer ester was obtained and analysis of the product was as follows:

|  | Monomer | Dimer |
|---|---|---|
| Acid No | 3.3 | 4.4 |
| Saponification No | 188 | 187 |
| Iodine No | 33 | 67 |
| Viscosity (at 20° C.) |  | 270 Cp |
| Polymer portion, percent |  | 11 |
| Lovibond 1″-cup: |  |  |
| Yellow |  | 28.9 |
| Red |  | 10.1 |
| Blue |  | 3.1 |

EXAMPLES VI TO VIII

The following examples demonstrate the criticality of the dimerization reaction temperature and the inert gas pressure. The methyl ester of soya bean fatty acid of Example I admixed with an equal volume of methanol was used and the inert gas was hydrogen. The other reaction conditions are summarized in the following table.

|  | Example | | |
|---|---|---|---|
|  | VI | VII | VIII |
| Temperature, ° C | 280 | 150 | 220 |
| Pressure in atmospheres | 250 | 250 | 10 |
| Catalyst of Example | V | I | I |
| Percent yield of dimer | 41 | 14 | 25 |
| Saponification No | 160 | 190 | 188 |
| Lovibond 1″-cup: |  |  |  |
| Yellow | 29.9 | 29.9 | 29.9 |
| Red | 7.3 | 6.5 | 29.9 |
| Blue | 0 | 0 | 3.2 |

Example VI shows that when the upper temperature limit is exceeded the dimer ester contained substantial amounts of unsaponifiable impurities as shown by the low saponification No. Example VII shows that below the lower temperature limit there is a substantial decrease in yield of the dimer ester. Example VIII shows that too low an inert gas pressure causes low yields and adversely affects the color of the dimer ester product.

Various modifications of the process of the invention may be made without departing from the spirit or scope thereof and it is to be understood that the invention is to be limited only as defined in the appended claims.

We claim:

1. A process for the continuous dimerization of esters of unsaturated fatty acids of 12 to 24 carbon atoms and an alcohol selected from the group consisting of saturated alkanols of 1 to 6 carbon atoms and cyclohexanol comprising passing esters of unsaturated fatty acids of 12 to 24 carbon atoms and a saturated alkanol and cyclohexanol admixed with a saturated alkanol of 1 to 6 carbon atoms or cyclohexanol through a stationary crystalline clay catalyst having a high content of a member selected from the group consisting of montmorillonite; kaolinite and attapulgite under a partial pressure of an inert oxygen free gas of 10 to 500 atmospheres at a temperature of 160 to 270° C., the volume ratio of fatty acid ester to saturated alcohol being 4:1 to 1:4 and separating unreacted monomer from the reaction product.

2. The process of claim 1 wherein the volume ratio of fatty acid ester to saturated alcohol is 2:1 to 1:2.

3. The process of claim 1 wherein the reaction temperature is 180 to 220° C.

4. The process of claim 1 wherein the partial inert gas pressure is 100 to 300 atmospheres.

5. The process of claim 1 wherein the ester of the fatty acid is the methyl ester and the alcohol is methanol.

6. The process of claim 1 wherein the crystalline clay is an acid clay.

7. The process of claim 1 wherein the crystalline clay is a neutral clay.

References Cited

UNITED STATES PATENTS

| 2,347,562 | 4/1944 | Johnston | 260—617 |
| 2,417,738 | 3/1947 | De Groote | 260—404.8 XR |
| 2,426,489 | 8/1947 | De Groote | 260—407 XR |
| 2,450,332 | 9/1948 | De Groote | 260—407 XR |
| 2,793,219 | 5/1957 | Barrett et al. | 260—407 |
| 2,793,220 | 5/1957 | Barrett et al. | 260—407 |
| 2,812,342 | 11/1957 | Peters | 260—407 XR |
| 2,955,121 | 10/1960 | Myers et al. | 260—407 |
| 3,076,003 | 1/1963 | Myers et al. | 260—407 |
| 3,100,784 | 8/1963 | Goebel | 260—407 |
| 3,157,681 | 11/1964 | Fisher | 260—407 |
| 3,251,869 | 5/1966 | Putnam | 260—407 |
| 3,328,438 | 6/1967 | Paschke | 260—407 |

LEON ZITVER, Primary Examiner

H. T. MARS, Assistant Examiner